United States Patent [19]

Kim

[11] Patent Number: 5,936,674
[45] Date of Patent: Aug. 10, 1999

[54] METHOD AND APPARATUS FOR CONCEALING ERRORS IN A TRANSMITTED VIDEO SIGNAL

[75] Inventor: Jin-Hun Kim, Seoul, Rep. of Korea

[73] Assignee: Daewoo Electronics Co., Ltd., Seoul, Rep. of Korea

[21] Appl. No.: 08/780,087

[22] Filed: Dec. 23, 1996

[30] Foreign Application Priority Data

Dec. 23, 1995 [KR] Rep. of Korea ..................... 95-55646

[51] Int. Cl.⁶ ..................................................... H04N 7/12
[52] U.S. Cl. ....................................... 348/420; 348/845.1
[58] Field of Search .................................. 348/845.1, 384, 348/390, 403, 413, 416, 407, 616, 466, 402, 420; 382/199, 254, 266, 275; H04N 7/68

[56] References Cited

U.S. PATENT DOCUMENTS

| 4,807,033 | 2/1989 | Keesen et al. | 348/616 |
| 5,353,059 | 10/1994 | Lawlor et al. | 348/398 |
| 5,737,022 | 4/1998 | Yamaguchi et al. | 348/416 |

FOREIGN PATENT DOCUMENTS 0712252  5/1996  European Pat. Off. .
9533341  12/1995  WIPO .

*Primary Examiner*—Tommy P. Chin
*Assistant Examiner*—Y. Lee
*Attorney, Agent, or Firm*—Anderson, Kill & Olick, P.C.

[57] ABSTRACT

For concealing channel errors in an image signal divided into a multiplicity of blocks of M×N pixels, M and N being positive integers, a lost region is detected, wherein the lost region is of a polygonal form having a plurality of sides and includes one or more connected lost blocks, each lost block containing a channel error. And then, a reference region of pixels including a plurality of groups of first and second pixels, each group of first pixels being adjacent to a side of the lost region and each group of second pixels being adjacent to a first group of pixels is found. Thereafter, edge pixels having non-zero valued edge magnitudes, an edge magnitude for a pixel representing differences between pixels residing adjacent to the pixel among pixels within the reference region are determined. And each edge point representing an edge pixel having a largest edge magnitude among the edge pixels included in groups of first and second pixels for a side of the lost region is detected. Thereafter, the channel errors of the lost region are rectified by compensating pixels within the lost region based on the edge points and the pixels of the reference region.

16 Claims, 5 Drawing Sheets

FIG.1
(PRIOR ART)

|   |   |   |
|---|---|---|
| 1 | 2 | 3 |
| 4 | 0 | 5 |
| 6 | 7 | 8 |

METHOD AND APPARATUS FOR
CONCEALING ERRORS IN A
TRANSMITTED VIDEO SIGNAL

FIELD OF THE INVENTION

The present invention relates to a method and apparatus for error concealment of a video signal; and, more particularly, to a method and apparatus for compensating lost block data through the use of edge information contained in those blocks surrounding the lost block.

DESCRIPTION OF THE PRIOR ART

In a digitally televised system such as video-telephone, teleconference or high definition television system, a large amount of digital data is needed to define each video frame signal since a video line signal in the video frame signal includes a sequence of digital data referred to as pixel values. Since, however, the available frequency bandwidth of a conventional transmission channel is limited, in order to transmit the substantial amount of digital data therethrough, it is necessary to compress or reduce the volume of the data through the use of various data compression techniques.

In conventional transmission systems, the video signal is compressed on a block-by-block basis by using, e.g., DCT (discrete cosine transform) and motion compensation techniques; and the compressed video signal is transmitted to a receiving end through a noisy transmission channel, which may entail channel errors such as data loss or damages in the transmitted video signals. Such transmission systems, however, do not provide sufficient overhead mechanism to restore all errors, but rather depend on error concealment at the receiving end in order to supply substitution data which approximates the lost data.

In one of the conventional error concealment schemes, a lost block and neighboring blocks thereof are detected first in the transmitted video signal. That is, as shown in FIG. 1, a lost block, e.g., block 0 and neighboring blocks thereof, e.g., blocks 1 to 8, surrounding the lost block, are determined. Subsequently, each pixel value within the lost block is compensated by a weighted mean value SB defined as:

$$SB = W_1(\overline{B_1}+\overline{B_3}+\overline{B_6}+\overline{B_8}) + W_2(\overline{B_2}+\overline{B_4}+\overline{B_5}+\overline{B_7}),\ (W_1+W_2=\frac{1}{4})$$

wherein $W_1$ and $W_2$ denote predetermined positive weight factors; and $\overline{B_1}$ represents an average value of all pixel values of an ith neighboring block with i ranging from 1 to 8.

Since, however, the error concealment technique described above generates substitution data of the lost block data by merely averaging all pixel values of the neighboring blocks without taking into account image particulars, e.g., edges, which may exist in the neighboring blocks, such substitution data may not faithfully reflect the original image data of the lost block.

SUMMARY OF THE INVENTION

It is, therefore, a primary object of the invention to provide an improved method and apparatus for rectifying channel errors in a transmitted video signal utilizing edge information included therein.

In accordance with the present invention, there is provided a method for concealing channel errors in an image signal, wherein the image signal is divided into a multiplicity of blocks of M×N pixels, M and N being positive integers, respectively, the method comprising the steps of: (a) detecting a lost region, wherein the lost region is of a polygonal form having a plurality of sides and includes one or more connected lost blocks, each lost block containing a channel error; (b) finding a reference region of pixels, wherein the reference region includes a plurality of groups of first pixels and a corresponding number of groups of second pixels, each group of first pixels being adjacent to a side of the lost region and each group of second pixels being adjacent to a group of first pixels, each group of first pixels being placed between a group of second pixels and the lost region; (c) determining edge pixels among the pixels within the reference region, each edge pixel having a non-zero valued edge magnitude, the edge magnitude for an edge pixel representing differences between pixels residing adjacent to the edge pixel; (d) detecting edge points, each of the edge points representing an edge pixel having a largest edge magnitude among edge pixels included in a group of first pixels and a group of second pixels for a side of the lost region; and (e) rectifying the channel errors of the lost region by compensating all pixels within the lost region based on the edge points and the pixels of the reference region.

BRIEF DESCRIPTION OF THE DRAWINGS

The above and other objects and features of the present invention will become apparent from the following description of preferred embodiments given in conjunction with the accompanying drawings, in which:

Figure 1:
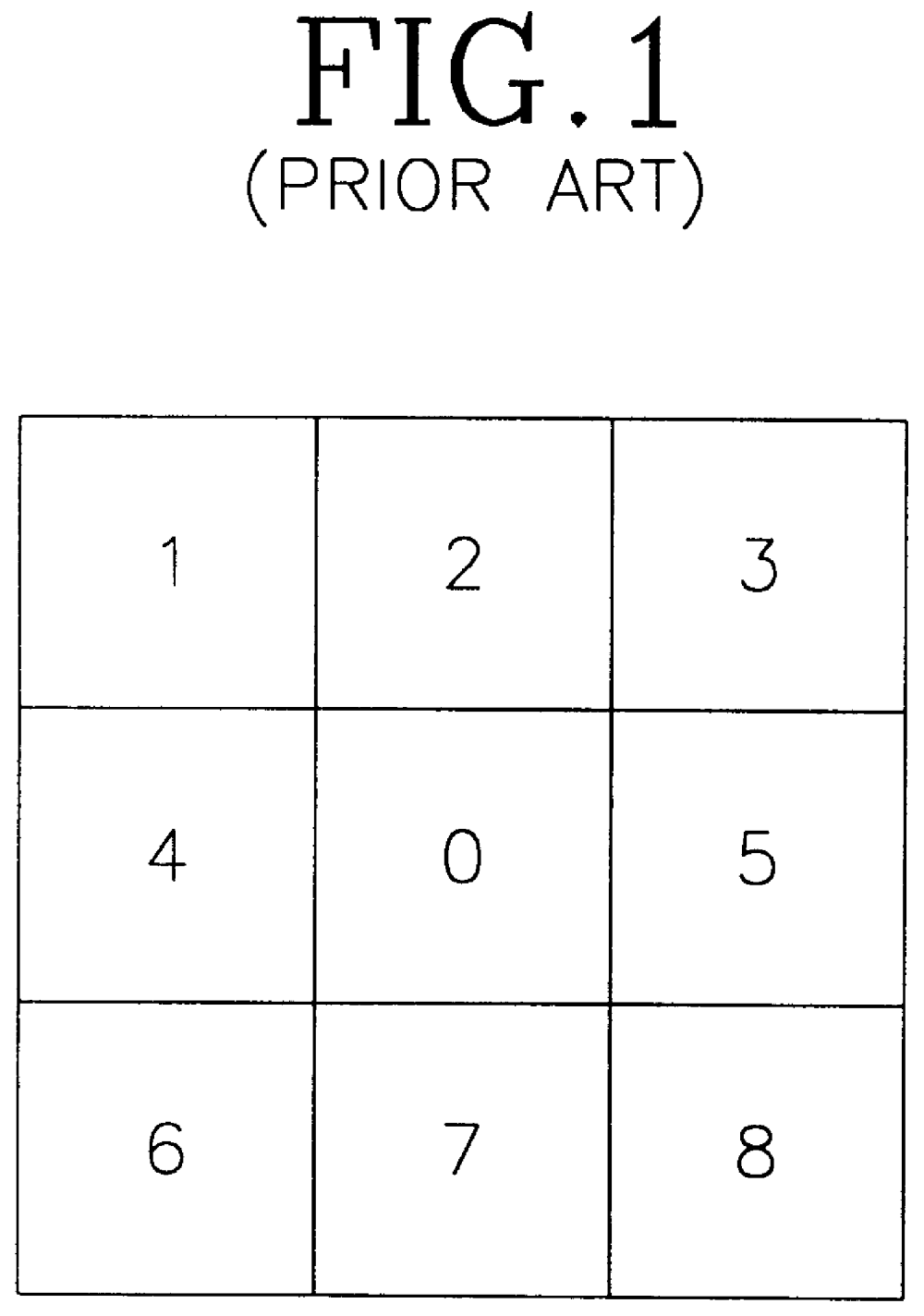

FIG. 1 represents a block arrangement for explaining a conventional error concealment scheme;

DETAILED DESCRIPTION OF THE PREFERRED EMBODIMENTS

Figure 2:
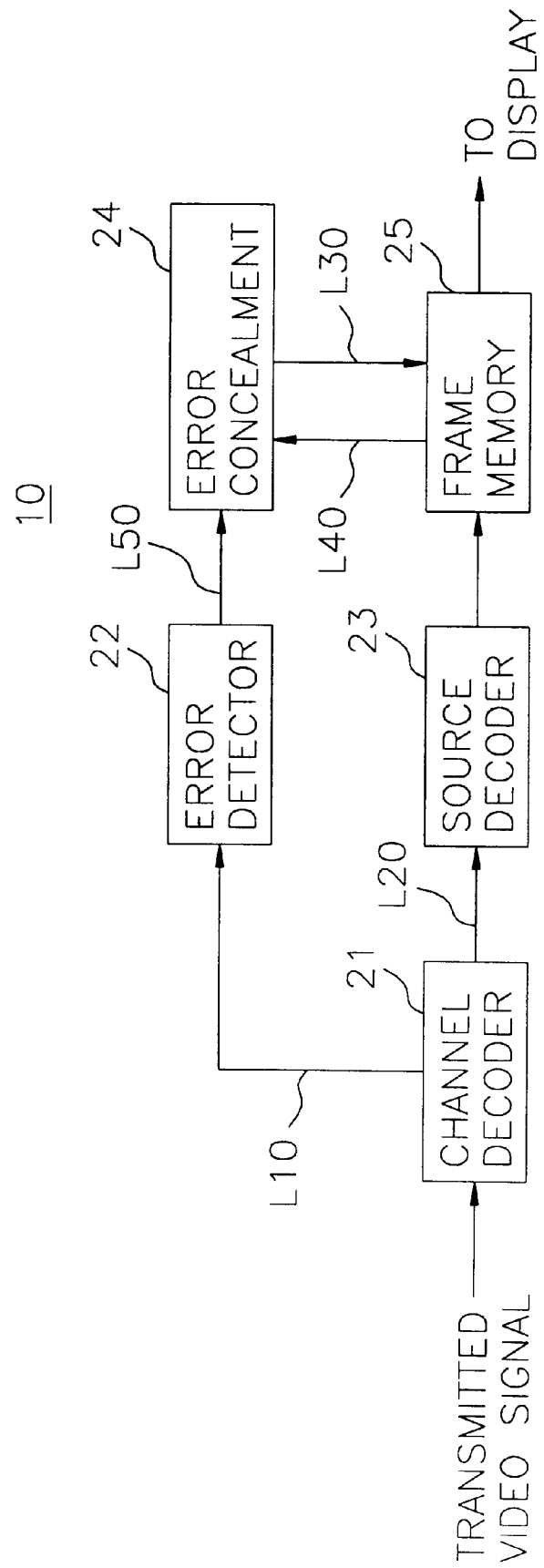
FIG. 2 illustrates a block diagram of a decoding apparatus having an error concealment block of the present invention.

Referring to FIG. 2, there is illustrated a block diagram of a decoding apparatus 10 including an error concealment block of the present invention. A transmitted video signal is transmitted from a transmission end (not shown) to a channel decoder 21. The transmitted video signal is of a compressed form encoded at the transmission end through the use of block based source coding schemes, e.g., DCT (discrete cosine transform) and motion compensation, and one of various channel coding methods, e.g., RS (Reed Solomon) coding technique. At the channel decoder 21, most of the channel errors occurred during the transmission process may be corrected based on redundancy bits appended by the channel coding scheme employed at the transmission end. If however, the number of channel errors is beyond the limit of the error correction capability provided by the channel coding scheme, data of a block containing such error(s) may not be restored and extra bits identifying such a block are appended thereto by the channel decoder 21. A channel-decoded video signal is then applied to an error detector 22 and a source decoder 23 via lines L10 and L20, respectively.

The error detector 22, responsive to the channel-decoded video signal, generates error block information representing positions of blocks containing uncorrected channel errors to provide it to an error concealment block 24 through a line L50. At the source decoder 23, portions of the channel-decoded video signal without any uncorrected channel errors are converted into an image signal through the use of, e.g., motion compensation and IDCT (inverse discrete cosine transform) schemes, wherein the image signal is divided into a multiplicity of blocks of M×N pixels, M and N being positive integers, respectively. The image signal provided from the source decoder 23 is fed to a frame memory 25 and stored therein.

In a preferred embodiment of the invention, a reference region is comprised of blocks surrounding a lost region and includes a plurality of sets of first neighboring pixels and sets of second neighboring pixels, wherein a set of first neighboring pixels is adjacent to a side of the lost region and a set of second neighboring pixels is adjacent to a set of first neighboring pixels. In other words, a set of first neighboring pixels is placed between a set of second neighboring pixels and the lost region.

In response to the error block information from the error detector 22 supplied via the line L50, the error concealment block 24 retrieves reference region pixel data for channel error containing blocks. And then the reference region pixel data is provided to the frame memory 25 on a line L30 and stored therein. A rectified image signal in the frame memory 25 including an image signal from the source decoder 23 and error concealed block data from the error concealment block 24 is transmitted to, e.g., a display (not shown).

Figure 3:
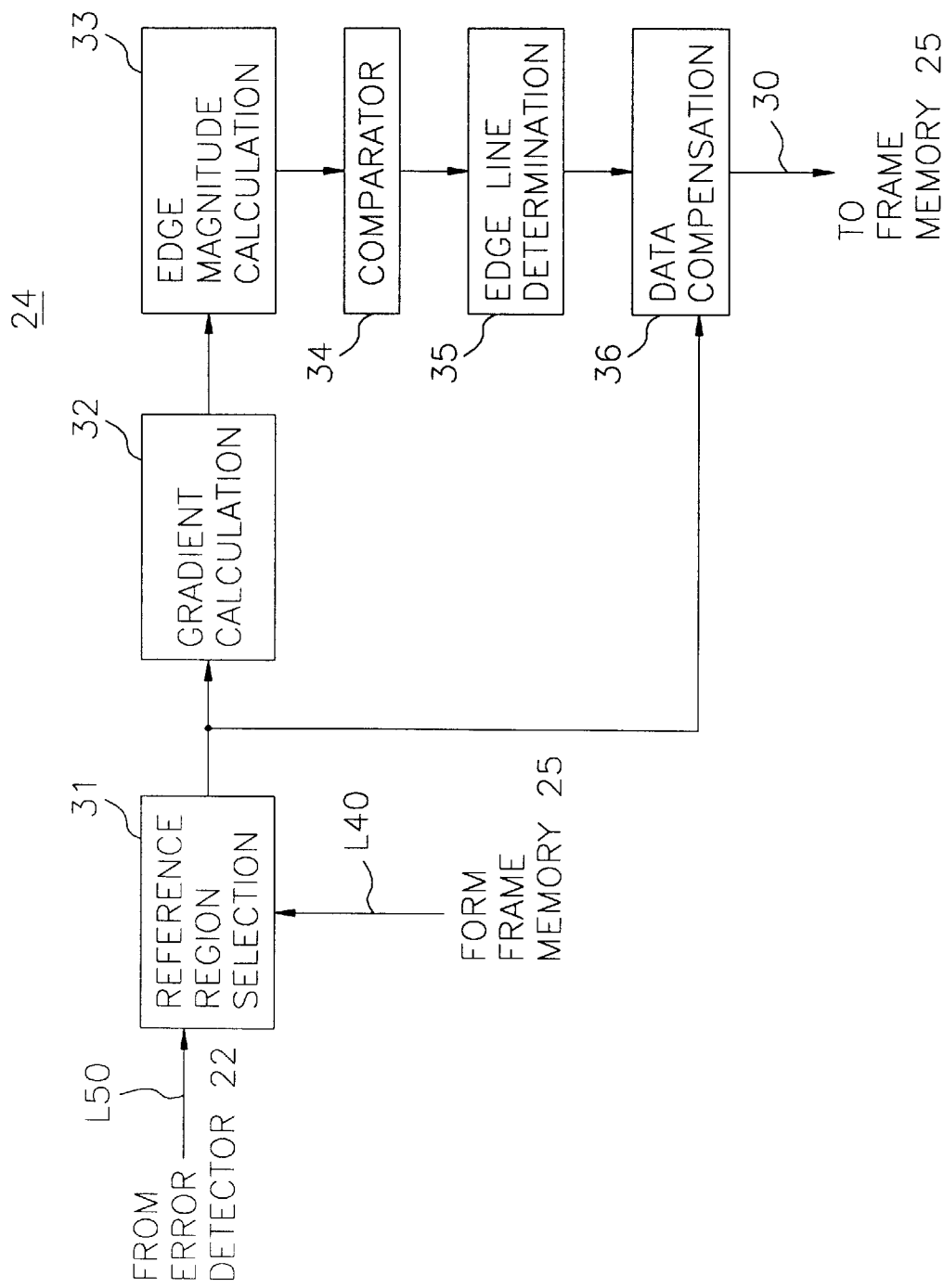
FIG. 3 depicts a detailed block diagram of the error concealment block scheme in FIG. 2.

Referring to FIG. 3, there are illustrated details of the error concealment block 24 shown in FIG. 2. A reference region selection block 31, in response to the error block information received through the line L50 from the error detector 22 shown in FIG. 2, detects lost regions, wherein each lost region includes one or more channel error containing blocks connected together and is of a shape of a polygon having a plurality of sides. Thereafter, the reference region selection block 31 determines a reference region for each of the lost regions and retrieves via the line L40 pixel data for the reference region from the frame memory 25. The retrieved pixel data for the reference region is then fed to a gradient calculation block 32 and a data compensation block 36.

At the gradient calculation block 32, edge gradients for each pixel within the reference region are calculated. In a preferred embodiment of the present invention, edge gradients at each pixel position are computed along the horizontal, the vertical and two diagonal directions by using Sobel operators $g_x$, $g_y$ and Roberts operators $g_a$, $g_b$, respectively defined as:

$$g_x = \frac{1}{4} \times \begin{pmatrix} 1 & 0 & -1 \\ 2 & 0 & -2 \\ 1 & 0 & -1 \end{pmatrix}$$

$$g_y = \frac{1}{4} \times \begin{pmatrix} -1 & -2 & -1 \\ 0 & 0 & 0 \\ 1 & 2 & 1 \end{pmatrix}$$

$$g_a = \begin{pmatrix} 0 & 0 & -1 \\ 0 & 1 & 0 \\ 0 & 0 & 0 \end{pmatrix}$$

-continued $$g_b = \begin{pmatrix} -1 & 0 & 0 \\ 0 & 1 & 0 \\ 0 & 0 & 0 \end{pmatrix}.$$

The calculated edge gradients $G_x$, $G_y$, $G_a$ and $G_b$ for each pixels within the reference region is provided to an edge magnitude calculation block 33, wherein an edge magnitude $G_{mag}$ for each pixel in the reference region may be calculated as:

$$G_{mag} = \sqrt{G_x^2 + G_y^2 + G_a^2 + G_b^2}.$$

The calculated edge magnitude $G_{mag}$ is then provided to a comparator 34, wherein the edge magnitude for the pixel in the reference region is compared with a predetermined threshold value TH stored therein. If the edge magnitude is smaller than the threshold value TH, it is set to be zero, and accordingly, the edge magnitude for a pixel in the reference region is either zero or non-zero valued edge magnitude greater than or equal to TH. The edge magnitude for each pixel in the reference region is dispatched to an edge line determination block 35.

Figure 4:
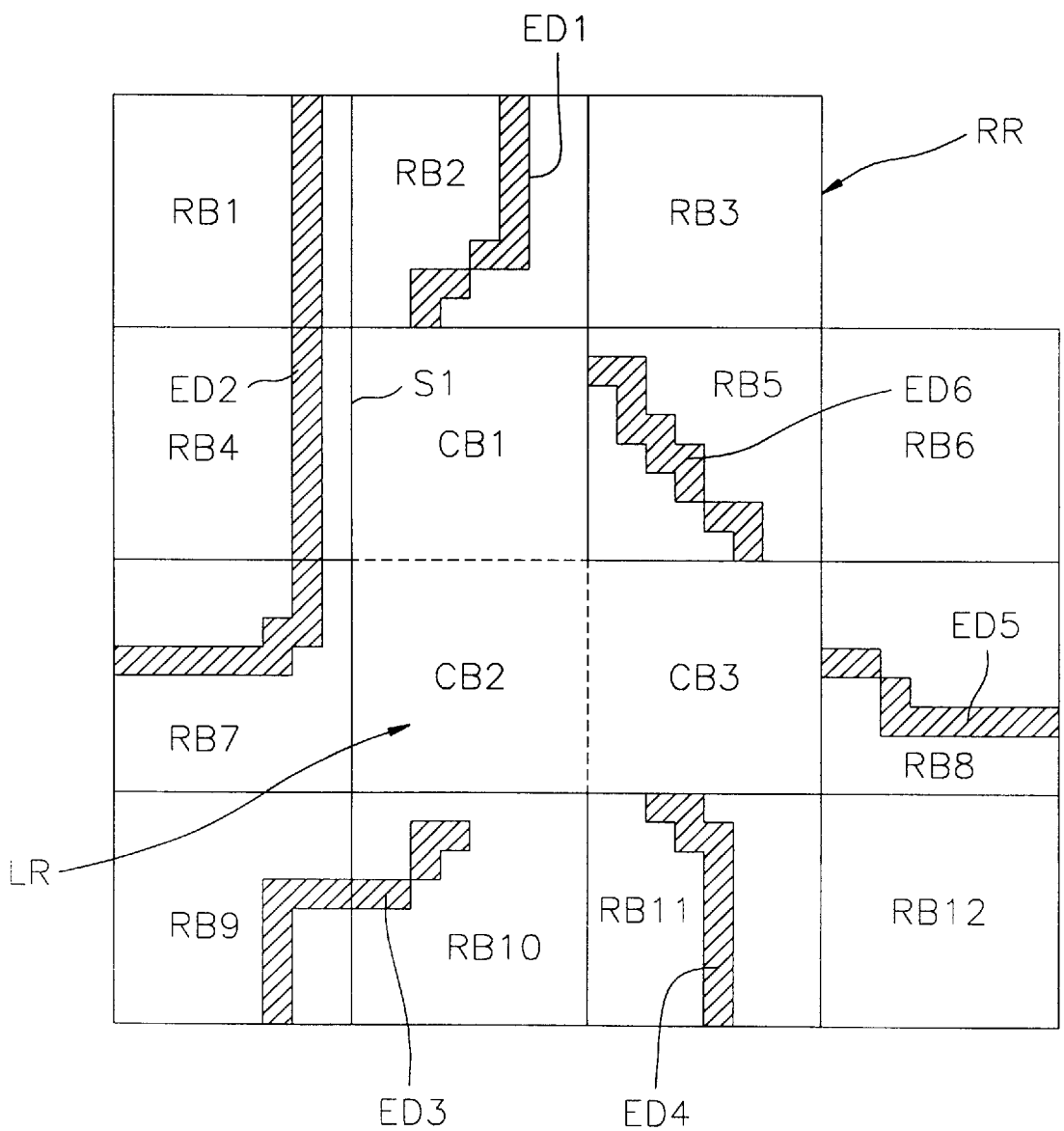
FIG. 4 shows a lost region and a reference region thereof for rectifying channel error containing blocks.

At the edge line determination block 35, edge lines are formed by connecting a group of pixels having non-zero valued edge magnitudes in the reference region. Referring to FIG. 4, there are illustrated exemplary edge lines ED1 to ED6 formed in a reference region RR surrounding a lost region LR, wherein the lost region LR includes three channel error containing blocks CB1 to CB3 and has six sides; and the reference region RR includes 12 blocks RB1 to RB12 encompassing the lost region LR.

Thereafter, it is checked whether the edge lines traverse the lost region and those edge lines traversing the lost region are defined as traversing edge lines. In FIG. 4, the edge line ED2 runs parallel to a side S1 of the lost region, therefore, the edge lines ED1 and ED3 to ED6 are regarded as the traversing edge lines. After determining traversing edge lines, pixels constituting the traversing edge lines and residing within a predetermined range from the sides of the lost region are selected as edge pixels. Specifically, in the preferred embodiment of the invention, among the pixels constituting the traversing edge lines, those pixels included in the sets of first and second neighboring pixels of the lost region are regarded as the edge pixels.

Subsequently, an edge pixel having a maximum edge magnitude is selected among edge pixels, if any, included in a set of first neighboring pixels and a set of second neighboring pixels to each side of the lost region and the selected edge pixel is defined as an edge point for the side. In this fashion, fewer than two edge points are assigned to each side of the lost region.

Figure 5:
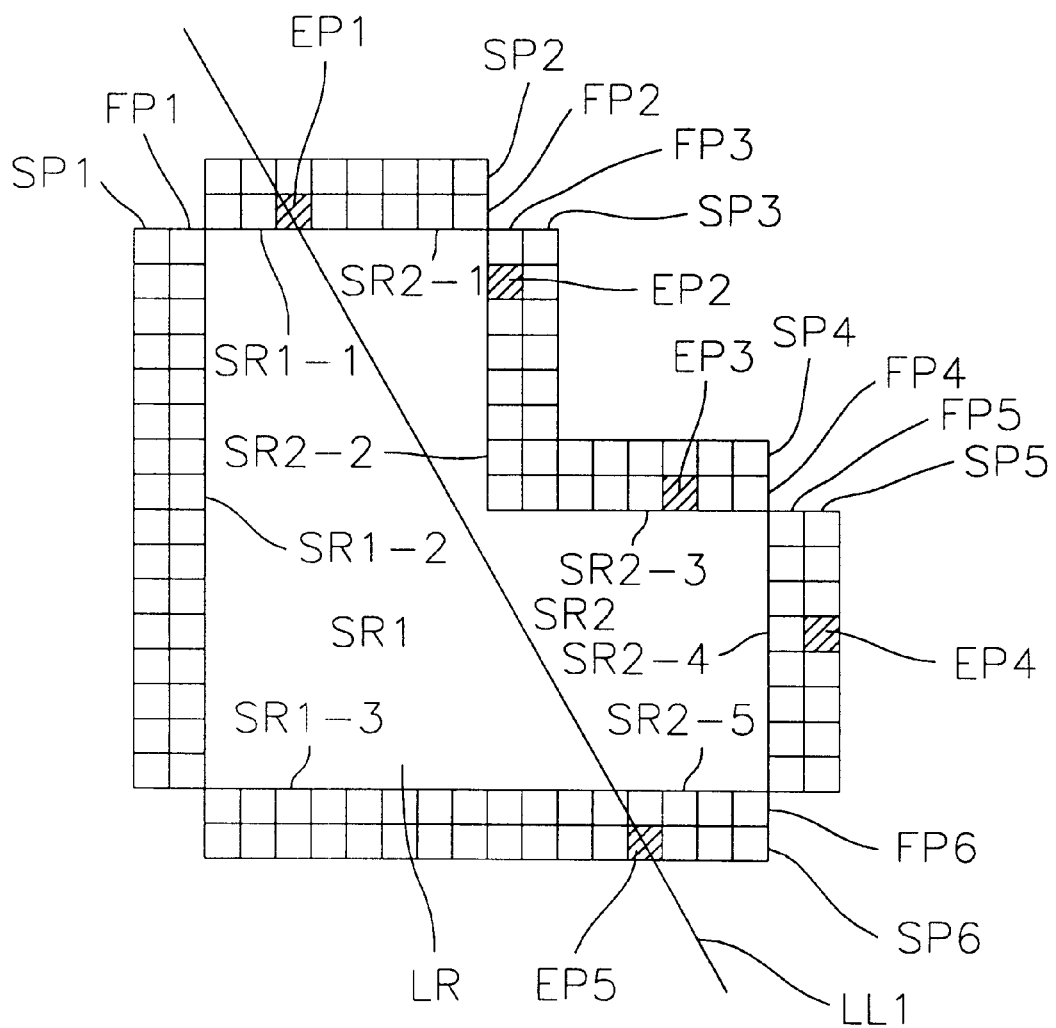
FIG. 5 presents a subregion formation scheme in accordance with the present invention.

Thereafter, if two or more edge points are determined for the lost block, two edge points having a first and a second largest edge magnitudes are selected as two primary edge points. For instance, as shown in FIG. 5, there are 5 edge points EP1 to EP5 for the lost region LR and the edge points EP1 and EP5 have a first and a second largest edge magnitudes among them, the edge points EP1 and EP5 are selected as the two primary edge points for the lost region LR. In FIG. 5, FP1 to FP6 and SP1 to SP6 represent sets of first neighboring pixels and sets of second neighboring pixels to the lost region LR, respectively.

Once the primary edge points are determined, a primary line, e.g., LL1 shown in FIG. 5, passing through the primary edge points is drawn and the lost region LR is divided by the primary line LL1 into two or more subregions, e.g., SR1 and SR2. On the other hand, if fewer than two edge points are detected, it is assumed that there is no primary line passing through the lost region LR and the lost region is not divided into subregions, but the region itself is defined as a subregion. After determining one or more subregions within the lost region as described above, subregion information representing a position and a shape of each subregion is provided to a data compensation block 36.

At the data compensation block 36, responsive to the subregion information from the edge line determination block 35 and pixel data of the reference region, pixel data for each subregion is obtained by using any known interpolation technique based on pixel data of the reference region. In the preferred embodiment of the invention, pixel values in a subregion is estimated by interpolating first neighboring pixels adjacent to sides of the subregion. For instance, as shown in FIG. 5, pixel values in the subregion SR1 are obtained by interpolating first neighboring pixel values adjacent to sides SR1-1 to SR1-3 thereof; and pixel values in the subregion SR2 are determined based on the first neighboring pixels adjacent to sides SR2-1 to SR2-5. Substitution data representing pixel values of each subregion obtained as described above is provided to the frame memory 25 via the line L30 and stored therein.

While the present invention has been described with respect to the particular embodiments, it will be apparent to those skilled in the art that various changes and modifications may be made without departing from the scope of the invention as defined in the following claims.

What is claimed is:

1. A method for concealing channel errors in an image signal, wherein the image signal is divided into a multiplicity of blocks of M×N pixels, M and N being positive integers, respectively, the method comprising the steps of:

(a) detecting a lost region, wherein the lost region is of a polygonal form having a plurality of sides and includes one or more connected lost blocks, each lost block containing a channel error;

(b) finding a reference region of pixels, wherein the reference region includes a plurality of groups of first pixels and a corresponding number of groups of second pixels, each group of first pixels being adjacent to a side of the lost region and each group of second pixels being adjacent to a group of first pixels, each group of first pixels being placed between a group of second pixels and the lost region;

(c) determining edge pixels among the pixels within the reference region, each edge pixel having a non-zero valued edge magnitude, the edge magnitude for an edge pixel representing differences between pixels residing adjacent to the edge pixel;

(d) detecting edge points, each of the edge points representing an edge pixel having a largest edge magnitude among edge pixels included in a group of first pixels and a group of second pixels for a side of the lost region; and (e) rectifying the channel errors of the lost region by compensating all pixels within the lost region based on the edge points and the pixels of the reference region;

wherein said rectifying step includes the steps of:

(e1) if two or more edge points are detected, determining two edge points of a first and second largest edge magnitudes as primary edge points and dividing the lost region into two or more subregions by a primary line passing through the primary edge points;

(e2) if fewer than two edge points are deleted, setting the lost region itself as a subregion; and (e3) rectifying the channel errors by compensating pixels within each subregion based on the pixels of the reference region.

2. The method according to claim 1, wherein the reference region is comprised of blocks encompassing the lost block.

3. The method according to claim 1, wherein said step (c) for determining edge pixels includes the steps of:

(c1) calculating edge magnitudes for the pixels in the reference region;

(c2) comparing each of the edge magnitudes with a predetermined threshold value TH;

(c3) setting each of the edge magnitudes smaller than TH as zero;

(c4) finding edge lines, each edge line being formed by connecting a group of pixels having non-zero valued edge magnitudes;

(c5) detecting edge lines traversing the lost region;

(c6) setting the edge magnitudes of the pixels other than those constituting the traversing edge lines as zero's; and (c7) defining the pixels of the non-zero valued edge magnitudes as the edge pixels.

4. The method according to claim 1, wherein the pixels within each subregion are compensated by substitution data obtained based on the group of first pixels.

5. The method according to claim 4, wherein the substitution data is obtained based on first pixels adjacent to sides of each subregion.

6. The method according to claim 5, wherein the substitution data is obtained by interpolating the first pixels adjacent to the sides of each subregion.

7. A method for concealing channel errors in an image signal, wherein the image signal is divided into a multiplicity of blocks of M×N pixels, M and N being positive integers, respectively, the method comprising the steps of:

(a) detecting a lost region, wherein the lost region includes one or more lost blocks connected together, each lost block containing a channel error;

(b) finding a reference region of pixels, wherein the reference region is a group of pixels residing outside the lost region;

(c) obtaining edge lines in the reference region, each edge line being formed by edge pixels connected together;

(d) determining primary lines among the edge lines, each primary line being an edge line traversing the lost region; and (e) rectifying channel errors of the lost region by compensating pixels of the lost region based on the primary lines and the pixels of the reference regions;

wherein said rectifying step (e) includes the steps of:

(e1) finding edge points, an edge point representing an edge pixel having a largest edge magnitude among edge pixels of the primary lines included in a set of first neighboring pixels for a side of the lost region;

(e2) if the number of edge points is fewer than two, setting the lost region as a subregion and if the number of edge points is greater than one, dividing the lost region into two or more subregions by a primary line passing through two primary edge points, the primary edge points being edge points of a first and a second largest edge magnitude; and (e3) compensating pixels of each subregion with substitution data obtained based on the pixels of the reference region, thereby rectifying the channel errors of the lost region.

8. The method according to claim 7, wherein said lost region is of a polygon having a plurality of sides and said reference region includes sets of first and second neighboring pixels, a set of first neighboring pixels being adjacent to a side of the lost region and a set of second neighboring pixels being adjacent to a set of first neighboring pixels, a set of first neighboring pixels being placed between a set of second neighboring pixels and the lost region.

9. The method according to claim 8, wherein said step (c) for obtaining the edge lines includes the steps of:

(c1) calculating edge magnitudes for the pixels within the reference region, an edge magnitude for a pixel representing differences between pixels neighboring to the pixel;

(c2) setting, as edge pixels, pixels having edge magnitudes greater than a predetermined threshold value TH; and (c3) connecting neighboring edge pixels into an edge line to thereby obtain the edge lines.

10. The method according to claim 7, wherein said step (d) for determining the primary lines includes the steps of:

(d1) deciding, as primary lines, edge lines having edge pixels among the first and the second neighboring pixels;

(d2) estimating direction of each primary line at a side of the lost region close to said each primary line; and (d3) detecting the primary lines, each of the primary lines having a direction not parallel to a side at which the direction is estimated.

11. The method according to claim 7, wherein said substitution data for each subregion is obtained based on first neighboring pixels adjacent to sides of each subregion.

12. An apparatus for decoding a transmitted video signal containing channel errors, comprising:

means for decoding the transmitted video signal to provide an image signal, the image signal being divided into a multiplicity of block of M×N pixels with M and N being positive integers, respectively;

means for storing the image signal;

means for detecting a reference region and retrieving reference region data from the storing means for a lost region, wherein the lost region represents a group of channel error containing blocks connected together and the reference region data denote pixel values of the reference region, the lost region being a polygon having a plurality of sides;

means for finding in the reference region edge lines traversing the lost region; and means for determining pixel data of the lost region based on the reference region data and the traversing edge lines to thereby store the determined pixel data in the storing means;

wherein determining means includes:

means for obtaining an edge point for each side of the lost region, the edge point representing an edge pixel having a largest edge magnitude among edge pixels of traversing edge lines residing within a predetermined range from said each side;

means for setting the lost region as a subregion if fewer than two edge points is obtained;

means for setting two edge points of a first and a second largest edge magnitudes as primary edge points if two or more edge points are obtained, and dividing the lost region into two or more subregions by a primary line passing through the primary edge points; and means for estimating pixel data of each subregion based on adjacent pixels of the reference region to sides of said each subregion and determining pixel data for the subregions as the pixel data of the lost region to be stored in the storing means.

13. The apparatus according to claim 12, wherein said finding means includes:

means for calculating an edge magnitude for each pixel in the reference region;

means for comparing the edge magnitude with a predetermined threshold value;

means for deciding edge pixels, the edge pixels having edge magnitudes greater than the predetermined threshold value;

means for generating edge lines, each edge line being comprised of edge pixels connected together; and means for selecting the traversing edge lines among the edge lines based on directions of the edge lines at the sides of the lost block.

14. The apparatus according to claim 13, wherein said means for calculating the edge magnitude includes:

means for calculating a vertical and a horizontal and two diagonal edge gradients for each pixel in the reference region; and means for computing the edge magnitude based on the edge gradients.

15. The apparatus according to claim 14, wherein said predetermined range corresponds to two pixels.

16. The apparatus according to claim 12, wherein said pixel data of each subregion is computed by interpolating the adjacent pixels.

* * * * *